(12) United States Patent
Kraipak et al.

(10) Patent No.: US 8,417,986 B2
(45) Date of Patent: Apr. 9, 2013

(54) TIME NEGOTIATION USING SERIAL VOLTAGE IDENTIFICATION COMMUNICATION

(75) Inventors: Waseem S. Kraipak, Maharashtra (IN); Jayesh Iyer, Karnataka (IN); Edward R. Stanford, DuPont, WA (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 12/912,952

(22) Filed: Oct. 27, 2010

(65) Prior Publication Data
US 2011/0154076 A1 Jun. 23, 2011

(30) Foreign Application Priority Data
Dec. 23, 2009 (IN) ............... 2694/DEL/2009

(51) Int. Cl.
*G06F 5/06* (2006.01)
(52) U.S. Cl.
USPC ........................................ 713/600

(58) Field of Classification Search .......... 713/600
See application file for complete search history.

(56) References Cited

U.S. PATENT DOCUMENTS

| | | | |
|---|---|---|---|
| 6,067,585 A * | 5/2000 | Hoang ............... | 710/11 |
| 6,532,506 B1 | 3/2003 | Dunstan et al. | |
| 6,539,443 B1 | 3/2003 | Dunstan et al. | |
| 6,735,633 B1 * | 5/2004 | Welch et al. ........ | 709/233 |
| 7,143,215 B2 | 11/2006 | Dunstan et al. | |
| 2008/0154400 A1 * | 6/2008 | Wang .................. | 700/94 |

* cited by examiner

*Primary Examiner* — Mark Connolly
(74) *Attorney, Agent, or Firm* — Buckley, Maschoff & Talwalkar LLC

(57) ABSTRACT

According to some embodiments, a method and system are provided to initiate communication at an integrated circuit that is electrically coupled to a plurality of voltage regulators, determine a slowest one of the plurality of voltage regulators that is electrically coupled to the integrated circuit, and communicate with the plurality of voltage regulators that are electrically coupled to the integrated circuit at a speed associated with the slowest one of the plurality of voltage regulators.

12 Claims, 5 Drawing Sheets

200

```
┌─────────────────────────────────────────────────┐
│                                                 │
│   Initiate communication at an integrated       │
│   circuit that is electrically coupled to a     │
│   plurality of voltage regulators               │
│                                                 │
│                                             201 │
└─────────────────────────────────────────────────┘
                          │
                          ▼
┌─────────────────────────────────────────────────┐
│   Determine a speed associated with a first     │
│   voltage regulator of the plurality of voltage │
│   regulators that is slower than a second       │
│   voltage regulator of the plurality of voltage │
│   regulators, wherein the plurality of voltage  │
│   regulators is electrically coupled to the     │
│   integrated circuit                            │
│                                             202 │
└─────────────────────────────────────────────────┘
                          │
                          ▼
┌─────────────────────────────────────────────────┐
│   Communicate with the plurality of voltage     │
│   regulators that are electrically coupled to   │
│   the integrated circuit at a speed associated  │
│   with the first voltage regulator              │
│                                             203 │
└─────────────────────────────────────────────────┘
```

FIG. 2

TIME NEGOTIATION USING SERIAL VOLTAGE IDENTIFICATION COMMUNICATION

BACKGROUND

Computer systems include many onboard systems that consume significant amounts of power. In some situations, a user may be using the computer system for tasks that do not require the use of each onboard system or that do not require each onboard system to function at full power. In this situation, the computer system may want to reduce power to specific onboard systems by sending a signal from a processor to a voltage regulator associated with the specific onboard systems.

In conventional computer systems, each voltage regulator must be configured to communicate with the processor at a set frequency that is pre-determined by the processor. For example, if the processor is configured to communicate at a frequency of 25 MHz, then each voltage regulator must communicate at 25 MHz. If a voltage regulator is not capable of communicating at the processor's pre-determined frequency, then the voltage regulator will not be able to communicate with the onboard processor.

BRIEF DESCRIPTION OF THE DRAWINGS

FIG. 2 illustrates a method according to some embodiments.

DETAILED DESCRIPTION

Figure 1:
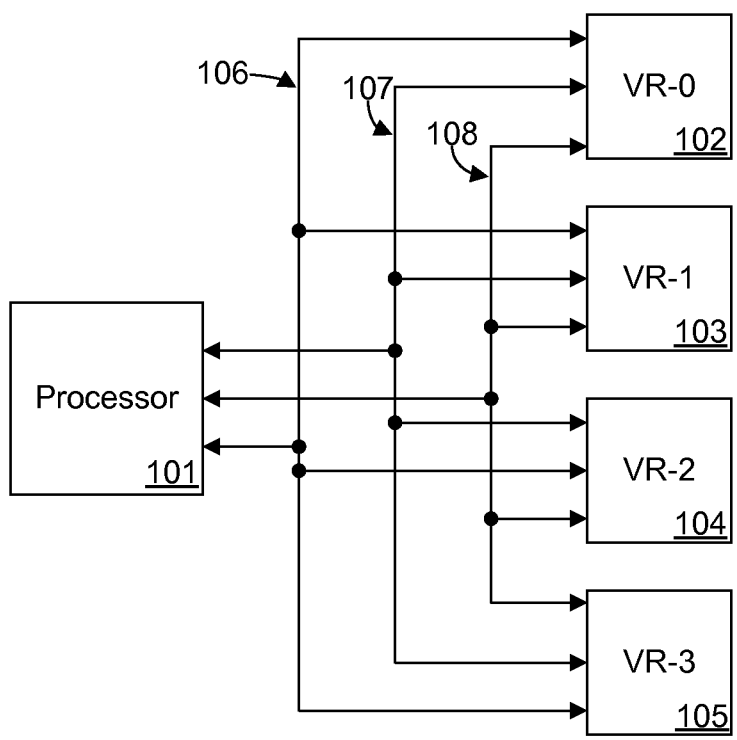
FIG. 1 illustrates a system according to some embodiments.

Referring now to FIG. 1, an embodiment of a system 100 is shown. The system 100 may comprise a processor 101 (e.g., a central processing unit or an integrated circuit), a plurality of voltage regulators 102/103/104/105, an open drain serial voltage identification (SVID) data bus 106, a SVID clock bus 107, and an open drain alert bus 108. In some embodiments, the voltage regulators 102/103/104/105 may comprise any slave device that is coupled to the SVID data bus 106, the SVID clock bus 107, and the alert bus 108. In some embodiments, the SVID data bus 106 may comprise an interconnect.

The processor 101 may be electrically coupled to each of the plurality of voltage regulators 102/103/104/105 via the SVID data bus 106, the SVID clock bus 107, and the alert bus 108. As indicated by their name, the SVID data bus 106 and the SVID clock bus 107 may facilitate serial communication between the processor 101 and the plurality of voltage regulators 102/103/104/105. In some embodiments of FIG. 1, a first one of the plurality of voltage regulators 102/103/104/105 may communicate with the processor 101 at a different frequency than a second one of the plurality of voltage regulators 102/103/104/105. For example, the voltage regulator VR-0 102 may communicate with the processor 101 at 25 MHz and voltage regulator VR-1 103 may communicate with the processor 101 at 22 MHz.

Now referring to FIG. 2, an embodiment of a method 200 is illustrated. According to some embodiments, the method 200 may facilitate communication between voltage regulators having different maximum communication speeds and an integrated circuit on a same serial bus. The method 200 may be performed by a system, such as, but not limited to, the system of FIG. 1. At 201, communication may be initiated at a integrated circuit that is electrically coupled to a plurality of voltage regulators. Communication may be initiated via a SVID data bus (e.g., an interconnect) and initiating communication may comprise driving a first bit of a SVID bus protocol packet to a first state (e.g., zero). In some embodiments, the integrated circuit may comprise a counter and initiating communication may further comprise initializing the counter (i.e., setting the counter to zero).

Figure 4:
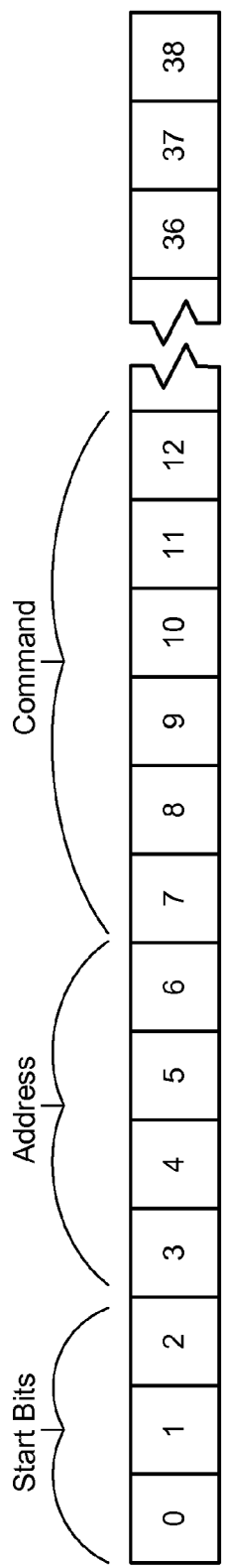
FIG. 4 illustrates a bus protocol packet according to some embodiments.

In some embodiments, after the integrated circuit resets the counter to zero, the integrated circuit may drive a first bit of a SVID bus protocol packet to a first state (e.g., zero) and start incrementing the counter. For example, and referring now to FIG. 4, the integrated circuit may start to send a 39-bit protocol packet that comprises three start bits and a 36-bit data frame. The integrated circuit may drive and hold the first bit to zero for a time associated with a data rate of the integrated circuit and then wait until each voltage regulator that is coupled to the integrated circuit releases the first bit on SVID data bus to one (e.g., a second state).

For illustrative purposes, and to aid in understanding features of the specification, an example will now be introduced. This example is not intended to limit the scope of the claims. For example, and referring to FIG. 1, a processor 101 may support a maximum data rate of 25 MHz, VR-0 102 may communicate with the processor 101 at 25 MHz, VR-1 103 may communicate with the processor at 22 MHz, VR-2 104 may communicate with the processor at 20 MHz, and VR-3 105, may communicate with the processor at 15 MHz. The processor 101, which includes a counter, may set the counter to zero. The processor 101, communicating at a data rate of 25 MHz, may initiate a SVID bus protocol packet on a SVID data bus by driving (e.g., setting) a first bit of the protocol packet to low (i.e., driving the SVID data bus to low) and, in response to driving the bit low, each voltage regulator VR-0/VR-1/VR-2/VR-3 may hold the SVID data bus low for a time associated with its particular data rate. The processor 101 may hold the SVID data bus low for a time period associated with 25 MHz (i.e., ½₅ μs is a time equal to the signal period corresponding to 25 MHz).

Referring back to FIG. 2, at 202, a speed associated with a first voltage regulator of the plurality of voltage regulators that is slower than a second voltage regulator of the plurality of voltage regulators where the plurality of voltage regulators is electrically coupled to the integrated circuit may be determined. Determining the speed may comprise monitoring, via the processor, the SVID bus to determine a maximum number of clock cycles (i.e., time) associated with the plurality of voltage regulators to hold the first bit of the SVID bus protocol to zero, before releasing it to the second state (e.g., one). The counter may determine the number of clock cycles.

In some embodiments, once each voltage regulator sets the SVID data bus to the second state (i.e., sets the first bit of the protocol packet to one or sets the first bit of the protocol packet high), the counter may stop incrementing and a speed associated with the a slowest voltage regulators may be determined. In some embodiments, and in response to the processor driving the first bit of the SVID bus protocol to zero (e.g., holding SVID bus low), each of the voltage regulators will also hold the first bit of the SVID bus protocol to zero (e.g., SVID bus low) for a time period associated with its particular data rate and then will release the bus (e.g., a first bit of the SVID bus protocol is released to one). Once the SVID data bus is released (e.g., a first bit of the SVID bus protocol is set to one), the counter may stop incrementing and a slowest speed associated with the voltage regulators may be determined.

Figure 5:
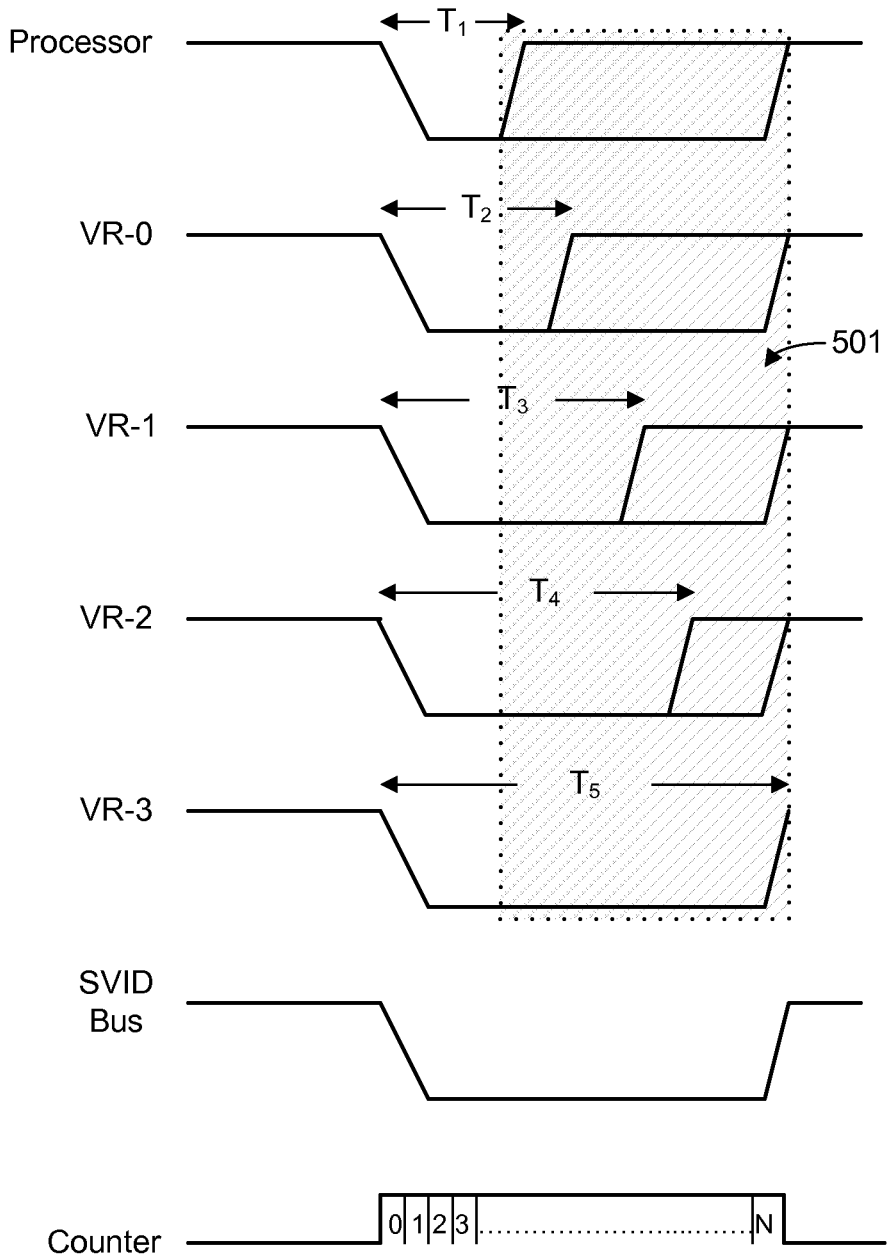
FIG. 5 illustrates a timing diagram of signal according to some embodiments.

Continuing with the above example, and referring now to FIG. 5, the processor may stop holding the SVID data bus to zero and may release the bus after a time $T_1$. In some embodiments, the processor may attempt to drive the SVID data bus high (e.g., set the first bit of the protocol packet to one) after a time $T_1$. In some embodiments, time $T_1$ may be associated with the processor's data rate. Since VR-0 is a fastest of the voltage regulators (i.e., operates at a higher frequency than the others), VR-0 will be a first voltage regulator to stop holding the SVID data bus to zero and will be a first voltage regulator to try to bring the SVID data bus to one. This is illustrated as time $T_2$. Next, VR-1 may attempt to bring the SVID data bus to one after time $T_3$ because VR-1 is slower than VR-0, but faster than VR-2. Next, VR-2 will attempt to bring the SVID data bus to one at time $T_4$. Finally, VR-3 will attempt to bring the SVID data bus to one after time $T_5$. At time $T_5$, the processor may determine that all voltage regulators have stopped holding the SVID data bus to zero and have brought the SVID data bus to one and the processor will instruct the counter to stop incrementing. At this point, the counter has counted 15 million clock cycles. The processor may then determine a slowest speed based on the counter. According to this example, the determined speed is 15 MHz, which is the speed associated with voltage regulator VR-3. During a time period between an end of T1 and an end of T5, as indicated by 501, the SVID data bus may be tristated by VR-0, VR-1, VR-2, and VR-3.

Next at 203, the plurality of voltage regulators that are electrically coupled to the integrated circuit will communicate at a speed associated with the slowest one of the plurality of voltage regulators. In response to determining a slowest speed, the integrated circuit may indicate to all voltage regulators coupled to the SVID data bus a slowest speed and future communication may occur at the slowest speed that is associated with the slowest voltage regulator.

Continuing again with the above example, the processor may communicate with the voltage regulators VR-0/VR-1/VR-2/VR-3 at a speed of 15 MHz; the speed associated with the slowest voltage regulator.

Figure 3:
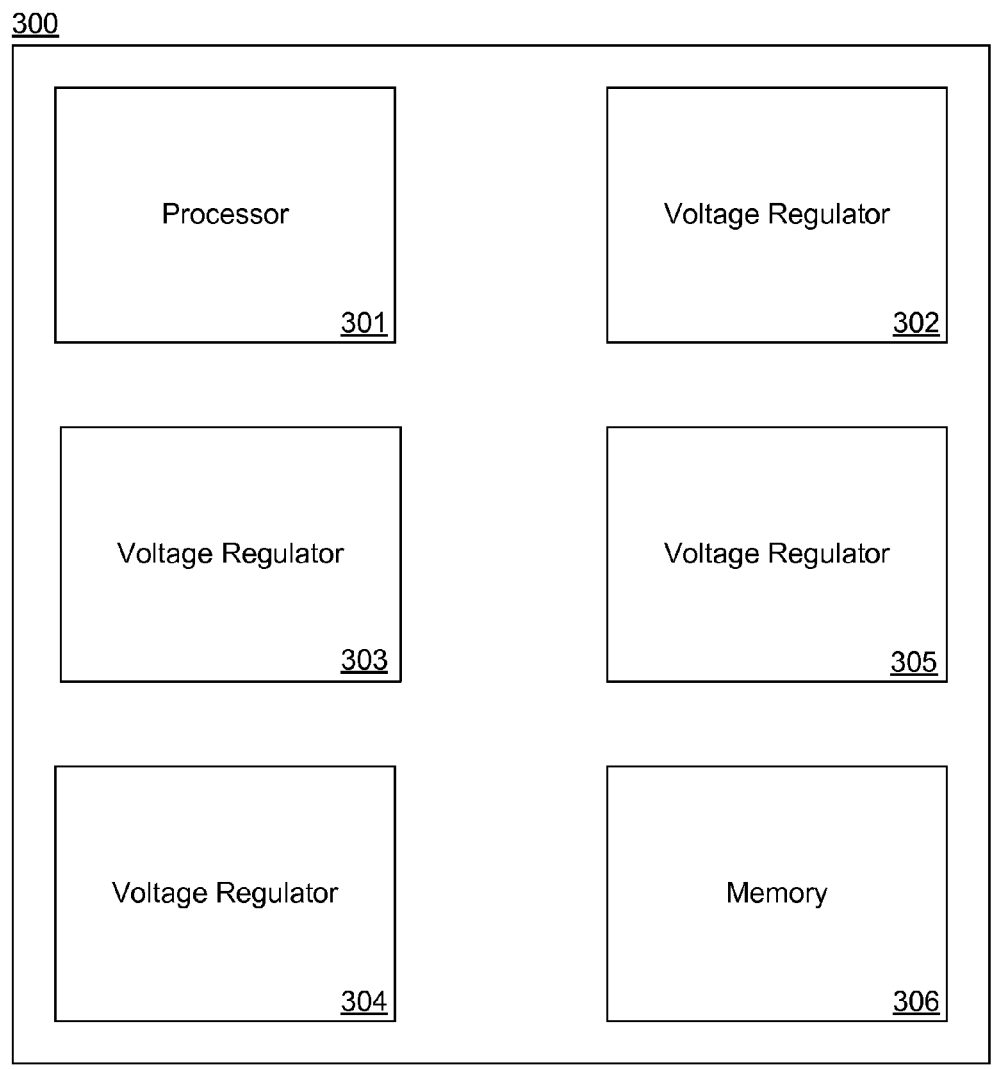
FIG. 3 illustrates a system according to some embodiments.

Now referring to FIG. 3, an embodiment of a computer system 300 is illustrated. The computer system may comprise a processor 301, a plurality of voltage regulators 302/303/304/305, and memory 306.

The memory 306 may store, for example, applications, programs, procedures, and/or modules that store instructions to be executed. The memory 306 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The processor 301 may include or otherwise be associated with dedicated registers, stacks, queues, etc. that are used to execute program code and/or one or more of these elements may be shared there between. In some embodiments, the processor may comprise an integrated circuit. The processor 301 may comprise circuitry to perform a method such as, but not limited to, the method described with respect to FIG. 2.

Each of the plurality of voltage regulators 302/303/304/305 may comprise an electrical regulator designed to automatically maintain a constant voltage level. Each of the plurality of voltage regulators 302/303/304/305 may use an electromechanical mechanism, or passive and/or active electronic components to regulate one or more AC or DC voltages.

Various modifications and changes may be made to the foregoing embodiments without departing from the broader spirit and scope set forth in the appended claims.

What is claimed is:

1. A method comprising:
    initiating communication at an integrated circuit that is electrically coupled to a plurality of voltage regulators, comprising:
        initializing a counter, and
        driving a first bit of a protocol packet to a first state;
    determining a speed associated with a first voltage regulator of the plurality of voltage regulators that is slower than a second voltage regulator of the plurality of voltage regulators, wherein the plurality of voltage regulators is electrically coupled to the integrated circuit, comprising:
        monitoring an interconnect to determine a maximum number of clock cycles associated with the plurality of voltage regulators to set the first bit of the protocol packet to a second state; and
    communicating with the plurality of voltage regulators that are electrically coupled to the integrated circuit at a speed associated with the first voltage regulator.

2. The method of claim 1, wherein the protocol packet comprises 39 bits and wherein the protocol packet is associated with a serial voltage identification (SVID) interconnect.

3. The method of claim 1, wherein the counter is stopped at a time associated with the maximum number of clock cycles associated with the plurality of voltage regulators to set the first bit of the protocol packet to a second state.

4. An apparatus comprising:
    an integrated circuit comprising:
    circuitry to initiate communication at an integrated circuit that is electrically coupled to a plurality of voltage regulators, comprising
        circuitry to initialize a counter, and
        circuitry to set a first bit of a protocol packet to a first state;
    circuitry to determine a speed associated with a first voltage regulator of the plurality of voltage regulators that is slower than a second voltage regulator of the plurality of voltage regulators, wherein the plurality of voltage regulators is electrically coupled to the integrated circuit; and
    circuitry to communicate with the plurality of voltage regulators that are electrically coupled to the integrated circuit at a speed associated with the first voltage regulator.

5. The apparatus of claim 4, wherein the counter is stopped at a time associated with the maximum number of clock cycles associated with the plurality of voltage regulators to set the first bit of the bus protocol packet to a second state.

6. The apparatus of claim 4, wherein the protocol packet comprises 39 bits.

7. The apparatus of claim 4, wherein the protocol packet is associated with a serial voltage identification (SVID) interconnect.

8. The apparatus of claim 4, wherein the circuitry to determine a speed associated with a first voltage regulator of the plurality of voltage regulators that is slower than a second voltage regulator of the plurality of voltage regulators comprises:
    circuitry to monitor an interconnect to determine a maximum number of clock cycles associated with the plurality of voltage regulators to set the first bit of the protocol packet to a second state.

9. The apparatus of claim 8, wherein the first state is a zero and wherein the second state is a one.

10. A system comprising:
an integrated circuit comprising:
circuitry to initiate communication at an integrated circuit that is electrically coupled to a plurality of voltage regulators, comprising:
initializing a counter, and
driving a first bit of a bus protocol packet to a first state;
circuitry to determine a speed associated with a first voltage regulator of the plurality of voltage regulators that is slower than a second voltage regulator of the plurality of voltage regulators, wherein the plurality of voltage regulators is electrically coupled to the integrated circuit and said determining comprises monitoring an interconnect to determine a maximum number of clock cycles associated with the plurality of voltage regulators to set the first bit of the protocol packet to a second state; and
circuitry to communicate with the plurality of voltage regulators that are electrically coupled to the integrated circuit at a speed associated with the first voltage regulator;
a plurality of voltage regulators; and
an interconnect that is electrically coupled to the integrated circuit and the plurality of voltage regulators.

11. The system of claim 10, wherein the SVID bus protocol packet comprises 39 bits and wherein the protocol packet is associated with a serial voltage identification (SVID) interconnect.

12. The system of claim 10, wherein the counter is stopped at a time associated with the maximum number of clock cycles associated with the plurality of voltage regulators to set the first bit of the protocol packet to a second state.

* * * * *